United States Patent
O'Sullivan et al.

(10) Patent No.: US 9,811,937 B2
(45) Date of Patent: Nov. 7, 2017

(54) COORDINATED GESTURE AND LOCOMOTION FOR VIRTUAL PEDESTRIANS

(71) Applicant: Disney Enterprises, Inc., Burbank, CA (US)

(72) Inventors: Carol A. O'Sullivan, Pasadena, CA (US); Kerstin Ruhland, Dublin (IE); Michael Neff, Oakland, CA (US); Yingying Wang, Davis, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/869,514

(22) Filed: Sep. 29, 2015

(65) Prior Publication Data

US 2017/0091976 A1   Mar. 30, 2017

(51) Int. Cl.
*G06T 13/40* (2011.01)
*G11B 27/00* (2006.01)

(52) U.S. Cl.
CPC .............. *G06T 13/40* (2013.01); *G11B 27/00* (2013.01)

(58) Field of Classification Search
USPC ........................................................ 345/473
See application file for complete search history.

(56) References Cited

U.S. PATENT DOCUMENTS

| | | | | |
|---|---|---|---|---|
| 6,285,380 B1 * | 9/2001 | Perlin | .................... | G06N 3/004 345/473 |
| 6,384,829 B1 * | 5/2002 | Prevost | .................... | G06T 3/403 345/472 |
| 6,570,555 B1 * | 5/2003 | Prevost | .................... | G06F 3/038 345/156 |
| 9,067,097 B2 * | 6/2015 | Lane | .................... | A63B 24/0087 |
| 2003/0193504 A1 * | 10/2003 | Cook | .................... | G06T 13/40 345/473 |

(Continued)

OTHER PUBLICATIONS

Sorkine-Hornung et al. "Move to the Beat: Coordinated Gesture and Locomotion for Virtual Pedestrians", Eurographics 2015, vol. 34 (2015), No. 2, Computer Graphics Forum ©2015 The Eurographics Association and John Wiley & Sons Ltd., Published by John Wiley & Sons Ltd., 10 pages.

(Continued)

*Primary Examiner* — Kimbinh T Nguyen
(74) *Attorney, Agent, or Firm* — Patterson + Sheridan, LLP

(57) ABSTRACT

Techniques for rendering realistic depictions of conversational gestures are provided. Embodiments include generating a data model for a first conversational gesture type, by analyzing captured video data to determine motion attribute data for a plurality of conversational gestures. Additionally, upon receiving a request to splice a gesture of the first conversational gesture type into a first animation, embodiments determine a locomotion of a first virtual character, while the first virtual character is interacting with a second virtual character within the first animation. A gesture of the first conversational gesture type is then stylized, using the generated data model and based on the determined locomotion of the first virtual character within the animation. Embodiments splice the stylized gesture into the locomotion of the first virtual character within the received animation data.

20 Claims, 8 Drawing Sheets

(56) References Cited

U.S. PATENT DOCUMENTS

| | | | | |
|---|---|---|---|---|
| 2007/0206017 | A1* | 9/2007 | Johnson | G09B 7/02 345/473 |
| 2012/0306741 | A1* | 12/2012 | Gupta | G06F 3/04815 345/156 |
| 2014/0356822 | A1* | 12/2014 | Hoque | G09B 19/04 434/185 |
| 2016/0127641 | A1* | 5/2016 | Gove | G06T 1/0007 348/143 |

OTHER PUBLICATIONS

Ghreimil et al. "Combined Partial Motion Clips," George Washington University School of Engineering and Applied Science, in WSCG (2003) 8 pages.

Bohus et al., "Facilitating Multiparty Dialog with Gaze, Gesture, and Speech," ICMI-MLM'10, Nov. 8-12, 2010, 8 pages.

Herbert H. Clark and Meredyth A. Krych, "Speaking while monitoring addresses for understanding," Journal of Memory and Language, Received Oct. 7, 2001; revision received Aug. 11, 2003. 20 pages.

Cassell et al., "Beat: the Behavior Expression Animation Toolkit," Proceedings of the 28th annual conference on computer graphics and interactive techniques, (2001) ACM, pp. 477-496.

David Efron, "Gesture and environment; a tentative stufy of some of the spatio-temporal and "linguistic" aspects of the gestural behavior of eastern Jews an southern Italians in New York City, living under similar as well as different environemtnal conditions," New York Kings Crown Press, 1941.

Montano et al., "BodySpeech: A configurable full body animation system for speaking avatars," Jul. 2013, [Abstract Only] [Accessed Online on Jun. 2, 2017] https://www.researchgate.net/publication/276153231_BodySpeech_A_configurable_full_body_animation_system_for_speaking_avatars.

Erdan Gu and Norman Badler, "Visual Attention and Eye Gaze Durning Mulitparty Conversations with Distractions," Lecture Notes in Computer Science, vol. 4133, Intelligent Virtual Agents, 2006, pp. 193-204.

Gosling, et al. "A very brief measure of the Big-Five personality domains," Journal of Research in Personality, 2003, 25 pages.

Kopp, "Synthesizing multimodal utterances for conversational agents," Computer Animation and Virtual Worlds, 2004; 155:39-52 (DOI:10.1002/cav.6).

Levine et al., "Gesture Controllers," ACM Transactions on Graphics (TOG) 29, 4 (2010), 124, 11 pages.

Jina Lee and Stacy Marsella, "Nonverbal Behavior Generator for Embodied Conversational Agents," Proceedings of be 6th International Conference on Intelligent Virtual Agents (2006) IVA'06, Springer-Verlag, pp. 243-255.

Lee et al., "The Rickel Gaze Model: A Window on the Mind of a Virtual Human," Intelligent Virtual Agents (2007), Springer Berlin/Heidelberg, pp. 296-303.

Levine et al., "Real-Time Prosody-Driven Synthesis of Body Language," ACM Transactions on Graphics (TOG) 28, 5 (2009, 172:1-172:10.

Evelyn Z. McClave, "Linguistic functions of head movements in the context of speech," Journal of Pragmatics, vol. 32, Issue 7, Jun. 2000, pp. 855-878 [Abstract Only] [Accessed Online Jun. 2, 2017] http://www.sciencedirect.com/science/article/pii/S037821669900079X.

David McNeil, "Hand and Mind: What gestures reveal about thought," The University of Chicago Press 1992.

David McNeil, "Gesture and Thought," University of Chicago Press, 2005.

Marsella et al., "Expressive Behaviors for Virtual Worlds," Lifelike characters, Cognitive Technologies, Springer (2004) pp. 176-360 [Abstract Only] [Assessed Online Jun. 2, 2017] https://link.springer.com/chapter/10.1007/978-3-662-08373-4_14?no-access=true.

Mousas et al., "Splicing of concurrent upper-body motion spaces with locomotion," Procedia Computer Science 25 (20130, 348/-359 [Abstract Only] [Accessed Online Jun. 2, 2017] https://www.researchgate.net/publication/259167312_Splicing_of_Concurrent_Upper-body_Motion_Spaces_with_Locomotion.

Majkowska et al, "Autoactic Splicing for Hand and Body Animations," Proceedings of the 2006 ACM SIGGRAPH/Eurographics symposium on computer animation (2006), Eurpographics Association, pp. 309-316.

Gleichier et al., Snap-together motion: assembling run-time animations. ACM SIGGRAPH 2008 classes (20080, ACM 8 pages.

Joy E. Hanna and Susan E. Brennan "Speakers' eye gaze disambiguates referring expressions early during face-to-face conversation," Journal of Memory and Language 57 (2007) pp. 596-615.

Dirk Heylen, "Head Gestures, Gaze and the Principles of Converstaional Structure," International Journal of Humanoid Robotics 03, (2006) pp. 241-267.

Heck et al., "Splicing Upper-Body Actions with Locomtion," Eurographics 2006/E. Grolier and L. Szirmay-Kalos, vol. 25 (2006) No. 3. 8 pages.

Hoyet et al., "Evaluating the distintiveness and attractiveness of human motions on realistic virtual bodies," ACM Trans. Graph. 32, 6 (2013) 11 pages.

Hadar et al., "Head movement during listening turns into conversation," Journal of NonVerbal Behavior 9, 4 (1985) pp. 214-224, [Abstract Only] [Accessed Online on Jun. 2, 2017] https://link.springer.com/article/10.1007/BF00986881?no-access=true.

Kovar et al., "Motion graphs," ACM Transactions on Graphics (TOG) 21, 3 (2002) pp. 473-482.

Kleinke et al., "Gaze and eye contact: A research review," [Abstract Only] [Accessed Online Jun. 2, 2017] https://www.researchgate.net/publication/19636298_Gaze_and_Eye_Contact_A_Research_Review.

Kita et al., "Movement Phases in Signs and Co-Speech Gestures, and their Transcription by Human Coders," Proceedings of the International Gesture Workshop on Gesture and Sign Language in Human Computer Interacation (1998), Springer-Verlag. pp. 23-35.

Ng et al., "Synchronized partial=body motion graphs," ACM SIGGRAPH Asia 2010 Sketches (2010) [Abstract Only][Accessed Online Jun. 2, 2017] http://dl.acm.org/citation.cfm?doid=1899950.1899978.

Neff, et al., "Gesture modeling and animation based on a probabilistic recreation of speaker style," ACM Trasactions on Graphics (TOG) 27, 1 (2008) [Abstract Only] [Accessed Online Jun. 2, 2017] http://dl.acm.org/citation.cfm?id=1330516.

Ondrej et al., "A synthetic-vision based steering approach for crowd simuation," ACM Transactions on Graphic, vol. 29. No. 4, Article 123, Jul. 2010, 9 pages.

Ennis et al., "Modeling groups of plasuible virtual pedestrians," IEEE Computer Graphics and Applications 29, 4 (2009) [Abstract Only] [Accessed Online Jun. 2, 2017] https://www.researchgate.net/publication/26865213_Modeling_Groups_of_Plausible_Virtual_Pedestrians.

Musse et al., "Hierarchical model for real time simulation of virtual human crowds," Visualization and Computer Graphics, IEEE Transactions on 7, 2 (20010 pp. 152-164.

Stone et al., "Speaking with hands: Creating animated conversational characters from recordings of human perforance," ACM Transactions on Graphics (TOG) 23, 3 (2004), pp. 506-513.

Safonova et al., "Construction and optimal search of interpolated motion graphs," ACM Transactions on Graphics (TOG) 26,3, (2007) 11 pages.

* cited by examiner

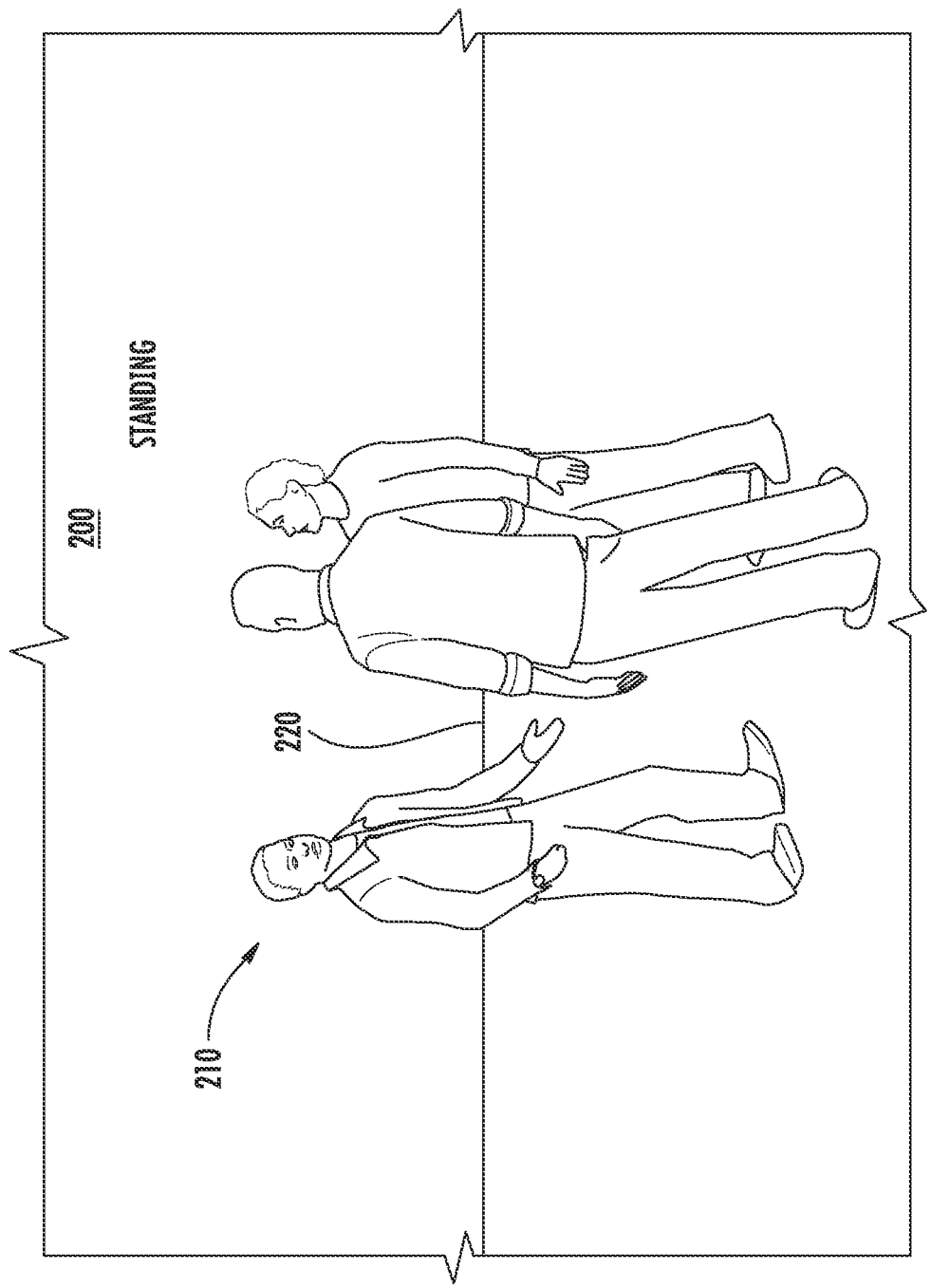

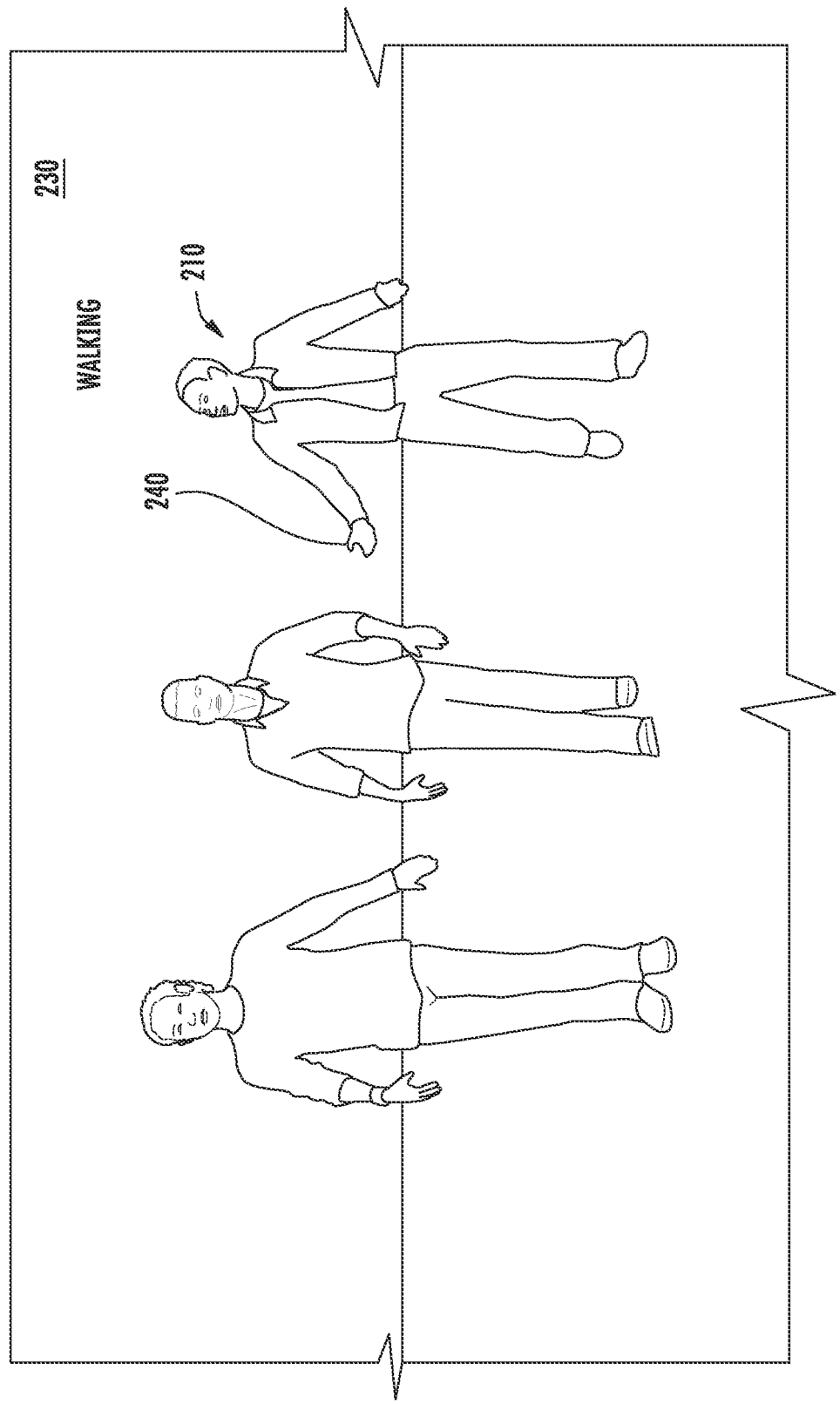

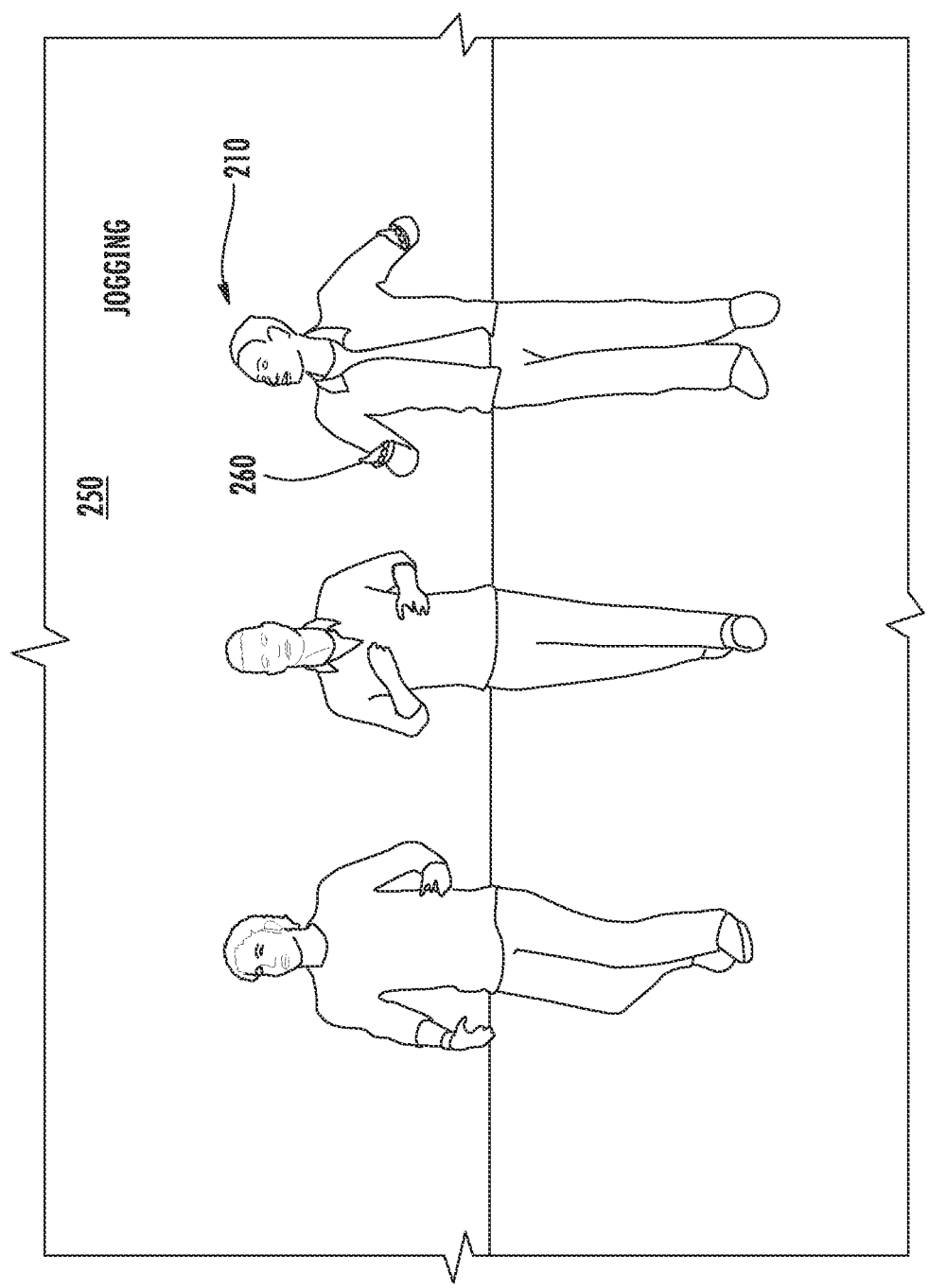

COORDINATED GESTURE AND LOCOMOTION FOR VIRTUAL PEDESTRIANS

BACKGROUND

Field of the Invention

Embodiments disclosed herein relate to computer-generated imagery (CGI) and computer-aided animation, and more specifically, this disclosure relates to techniques for realistically rendering video with conversational gestures.

Description of the Related Art

With the increasingly wide-spread availability of computers, many graphic artists and animators rely upon computers to assist in the production process for the creation of animations, computer-generated imagery (CGI) and the like. In doing so, the artists and animators may create virtual models stored in computer memory that represent physical models or other entities (e.g., fictitious characters). Typically, two-dimensional (2D) or three-dimensional (3D) computer-aided animation combines 2D/3D models of objects and programmed movement of one or more of the models. In 3D computer animation, an object modeling process can be used in which objects are sculpted, akin to working with real clay or plaster, working from general forms to specific details, for example, with various sculpting tools. Models may be constructed, for example, out of geometrical vertices, faces, and edges in a 3D coordinate system to represent the objects. These virtual models can be manipulated using computers to, for example, simulate physics, design aesthetic actions such as poses or other deformations, create lighting, coloring and paint, or the like, of characters or other elements of a computer animation display.

Generally speaking, if the physical properties and external forces acting on a simulated object are accurately modeled, the resulting motion of the simulated object will be plausible and seemingly realistic. For instance, in rendering a virtual character wearing a jacket, the cloth of the jacket should hang down and fold naturally (i.e., as the physical cloth of a physical jacket would hang and fold). Furthermore, the cloth should react according to the motions and positions of the virtual character when the virtual character wears the jacket. In a similar fashion, the behavior and mannerisms of the virtual character should mirror the behavior and mannerisms of a real person, in order for the rendered scene to appear realistic. However, modeling simulated objects to be truly accurate is a delicate balance between the limitations and complexities of the animators knowledge of physics and particle systems on the one hand and budgetary and time constraints on the other.

SUMMARY

One embodiment provides a method of rendering realistic conversational gestures between virtual characters. The method includes generating a data model for a first conversational gesture type, by analyzing captured video data to determine motion attribute data for a plurality of conversational gestures. Additionally, the method includes, upon receiving a request to splice a gesture of the first conversational gesture type into a first animation, determining a locomotion of a first virtual character, while the first virtual character is interacting with a second virtual character within the first animation. The method further includes stylizing a gesture of the first conversational gesture type, using the generated data model and based on the determined locomotion of the first virtual character within the animation. The method also includes splicing the stylized gesture into the locomotion of the first virtual character within the received animation data.

Additional embodiments provide a non-transitory computer-readable medium and a system containing computer program code that, when executed, performs the aforementioned method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A-C illustrate rendered images with different preexisting movements into which a conversational gesture was spliced, according to embodiments described herein.

DETAILED DESCRIPTION

Figure 1:
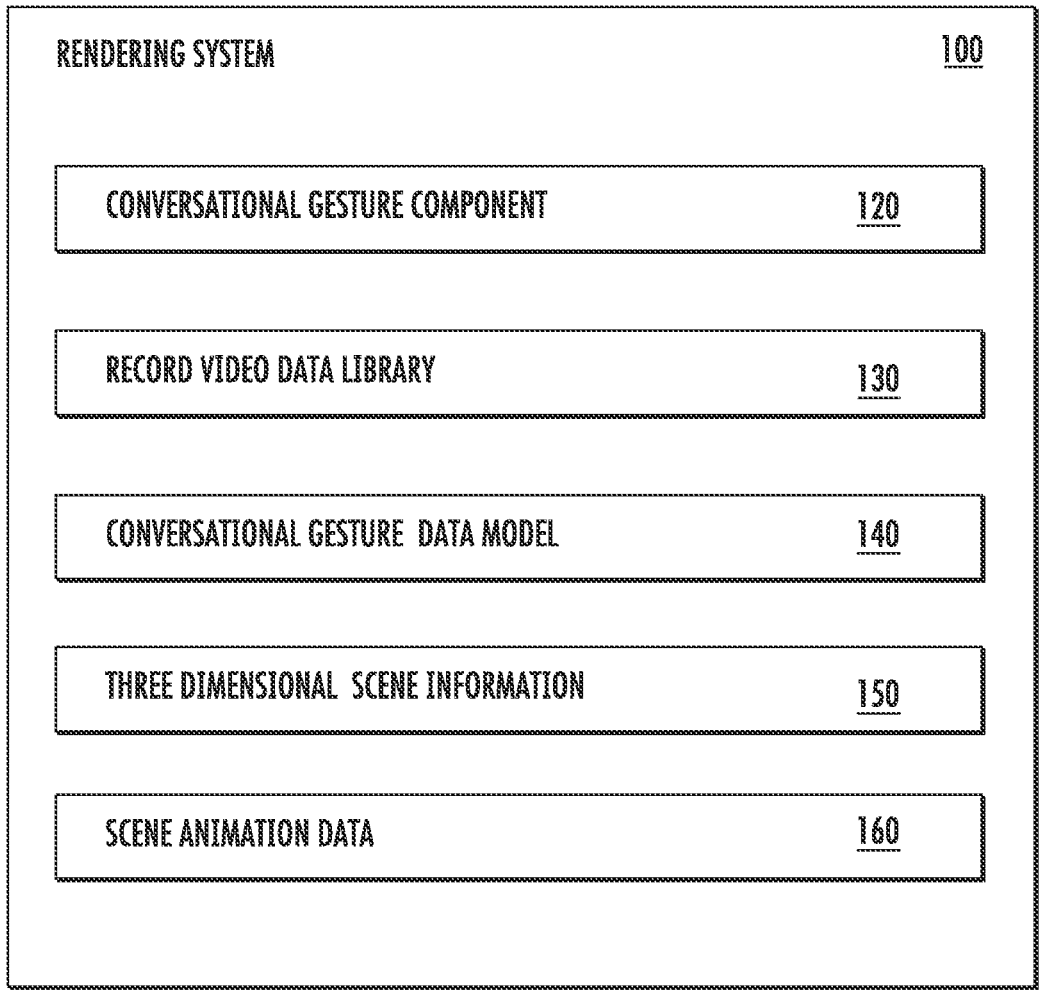
FIG. 1 is a block diagram illustrating a system configured with a conversational gesture component, according to one embodiment described herein.

Numerous computing platforms and tools have been specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec). One core functional aspect of PRMan can include the use of a "rendering engine" to convert geometric and mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation.

Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

For simulated clothing objects, for example, the animator can specify the physical properties and construction of the cloth. For example, the animator specifies how the cloth bends due to forces or collisions with solid objects. The animator could further specify how the cloth deforms or collides with itself, and could specify external forces that act on the cloth, such as gravity and wind. In addition to modeling the physical properties of the simulated objects, the animator specifies motions and positions of kinematic or non-simulated objects (e.g., characters upon which the clothing objects rest). The animation of a non-simulated object generally is independent of and otherwise unaffected by motions and positions of simulated objects. However, the motions and positions of the non-simulated objects often are the principal influencer of motions and positions of simulated objects, as clothing and hair are likely to be associated with a kinematic character.

Consider a computer animation of a human character standing upright, wearing a jacket. In this example, the human character is a kinematic or non-simulated object that is directly animated by the skilled human animator. The animator can generally specify the physics (e.g., the physical properties) of the jacket which is a simulated object, and can model how the jacket is associated with and worn by the human character. The computer program can then simulate the motions and positions of the jacket using physically-based numerical techniques, in response to external forces and the motions and positions of the human character.

Generally, if the physical properties and external forces acting on a simulated object are accurately modeled, the resulting motion of the simulated object will be plausible and seemingly realistic. For instance, in the jacket example, the cloth of the jacket should generally hang down and fold naturally. Furthermore, the cloth should react according to the motions and positions of the human character when the human character wears the jacket. However, modeling the simulated objects to be truly accurate is a delicate balance between the limitations and complexities of the animators knowledge of physics and particle systems on the one hand and budgetary and time constraints on the other.

In addition to modeling simulated objects, the behaviors and mannerisms of the virtual characters must be modeled accurately in order to produce a realistic animation. Communicative behaviors are an important aspect of human behavior, and as such, deserve special attention when simulating groups and crowds of virtual characters. Generally, a communicative behavior or gesture refers to an action(s) taken as part of a communication (e.g., a conversation). For instance, a character who is speaking may make various gestures with his hands while speaking. Likewise, a character being depicted as listening may nod his head while another character is speaking.

A generally realistic and convincing animation can be produced when communicative gestures and behaviors are simply applied to virtual characters who are otherwise substantially motionless. That is, when a virtual character is otherwise standing still, a communicative gesture (e.g., a particular hand and arm movement, while the virtual character is animated as speaking) can simply be composited with the virtual character's existing motion to produce a relatively realistic scene. Listener behaviors can also be simulated by applying corresponding gestures to other virtual characters in the scene (e.g., a nodding motion performed while another virtual character is speaking). Thus, for a relatively motionless scene (i.e., where, but for the conversational gestures, the virtual characters are otherwise standing still), compositing sophisticated gestures and talker-listener behaviors to any existing character behaviors can produce a generally realistic scene.

However, when the virtual characters involved in the conversation are performing another movement while carrying on the conversation (e.g., jogging), simply adding or compositing the predefined conversational gestures onto the existing character movement results in an unrealistic virtual scene. For instance, the movement of the virtual characters may appear jittery or otherwise peculiar at positions where the composite of the preexisting movement and the conversational gesture cause the virtual character to behave in unnatural ways. As an example, simply compositing the preexisting movement with the conversational gesture may lead to the movements of the conversational gesture being out of sync with the preexisting movements, e.g., the hand movement of the conversational gesture could be out of sync with the stride and arm movement of a jogging character. As another example, humans may perform particular conversational gestures differently, depending on what other movements they are performing. For example, when jogging, humans may tend to direct their gaze straight ahead to see the path ahead of them, rather than gazing at the person they are speaking to. However, a simple composite of the conversational gesture and the jogging movement would not take this into account, and as such would produce a less realistic scene.

As such, embodiments provide techniques for rendering realistic depictions of conversational gestures. For instance, embodiments may generate a data model for a first conversational gesture type, by analyzing captured video data to determine motion attribute data for a plurality of conversational gestures. For instance, the captured video data could include a multitude of video segments captured from real-world human beings performing various conversational gestures. Generally, embodiments can analyze such video data to determine various conversational gestures that are routinely performed. Moreover, embodiments could separate conversational gestures routinely performed by users who are speaking from conversational gestures that are routinely performed by users who are listening.

Upon receiving a request to splice a gesture of the first conversational gesture type into a first animation, embodiments could determine a locomotion of a first virtual character, while the first virtual character is interacting with a second virtual character within the first animation. That is, embodiments can determine an existing motion that is being performed by the first virtual character. As an example, such an existing motion could include the various movements involved in performing the act of jogging, including leg movements, arm movements, torso movements, and the like.

Embodiments can then splice a gesture of the first conversational gesture type into a movement of the first virtual character within the received animation data, using the generated data model and based on the determined locomotion of the first virtual character within the animation. For example, embodiments could modify predefined motion data for the gesture to match the virtual character's preexisting locomotion (e.g., jogging), using the generated data model. As an example, embodiments could identify data within the generated data model describing how individuals in the captured video data performed similar conversational gestures while performing similar locomotive actions, and could modify the gesture in accordance with such data. In doing so, embodiments could synchronize the movement of the conversational gesture with the movement of the existing locomotion. The gesture could then be spliced into the character's preexisting locomotion and the scene could then be rendered to produce a realistic animation.

FIG. 1 is a block diagram illustrating a rendering system configured with a conversational gesture component, according to one embodiment described herein. As shown, the rendering system 100 includes a conversational gesture component 120, a recorded video data library 130, a conversational gesture data model 140, three-dimensional scene information 150 and scene animation data 160. The recorded video data library 130 generally contains a plurality of video clips depicting various users performing conversational gestures of various types. Examples of such gestures include various hand gestures, nodding gestures, facial expression gestures, and so on. In one embodiment, the video data within the recorded video data library 130 is stored within a database managed by a database management system (DBMS). More generally, however, it is contemplated that any sort of conversational gesture can be included in any sort of recorded video data library 130, consistent with the functionality described herein.

The three-dimensional scene information 150 generally specifies various elements that make-up a three-dimensional scene. Such elements can include, without limitation, geometric primitives, geometric objects, lighting information, coloration information, shadow information, atmospheric information, texture information, optical effects (e.g., refraction of light information, motion-blue information, etc.), and so on. More generally, the three-dimensional scene information 150 can include any information that can be used in rendering a virtual scene, consistent with the functionality described herein.

Generally, the conversational gesture component 120 is configured to generate a realistic rendered animation by splicing a conversational gesture into an existing animation specified within the scene animation data 160. For example, the conversational gesture component 120 could generate the conversational gesture data model 140 by analyzing the recorded video data library 130 to determine motion attribute data for a plurality of conversational gestures. That is, the conversational gesture component 120 could analyze the video data within the recorded video data library 130 (e.g., an existing motion database) to determine attributes of how real-world individuals perform conversational gestures. Generally, it is preferable to have a diverse sampling of video data depicting various individuals performing a particular type of gesture within the recorded video data library 130. For example, the recorded video data library 130 could contain a number of different captured videos depicting standing conversations between random samplings of group conversations between an assortment of three men and women (or more generally, any grouping of individuals). In one embodiment, the conversational gesture component 120 is configured to re-sample portions of video data within the recorded video data library 130 to normalize various attributes (e.g., frames per second) across all video data within the recorded video data library 130.

Upon analyzing the recorded video data library 130, the conversational gesture component 120 can construct the conversational gesture data model 140 to represent one or more types of gestures. In one embodiment, the conversational gesture component 120 is configured to represent a type of gesture using multiple temporal phases. For instance, the conversational gesture component 120 could represent a gesture using the temporal phases of preparation, stroke, hold and retraction. Generally, the primary meaning of a gesture is carried out during the stroke phase. The preparation phase, in turn, generally places the individual's arm, wrist, hand and fingers in the proper configuration to begin the stroke phase. During the retraction phase, the individual generally returns the arm to a resting position. In one embodiment, a user(s) manually annotates video data within the recorded video data library 130 to explicitly specify where each temporal phase begins and ends for the corresponding recorded video. In a particular embodiment, the conversational gesture component 120 is configured to dynamically determine when each temporal phase begins and ends, for a given gesture in a given instance of video content.

Generally, the conversational gesture component 120 can be configured to recognize any number of different gestures. For instance, in one embodiment, the conversational gesture component 120 is configured to recognize different types of gestures according to a taxonomy that includes beat gestures, deictic gestures, iconic gestures and metaphoric gestures. Generally, a beat gesture refers to a rhythmic flick of a finger, hand or arm to highlight what the individual is saying. A deictic gesture refers to a pointing, directional gesture. An iconic gesture refers to a representation of a concrete object or drawing with the individual's hand. And a metaphoric gesture refers a representation of an abstract concept. In addition to recognizing multiple types of gestures, the conversational gesture component 120 can determine other attributes such as the gesturing individual's handedness (e.g., left-handed or right-handed) and the addresser/addressee relationship of the individuals involved in the conversation. In one embodiment, a user(s) manually annotates the gesture type and other attributes of video content within the recorded video data library 130.

Moreover, such a gesture (as well as the locomotion being spliced with the gesture) can come from a variety of sources. For instance, the gesture (and/or the locomotion) could be obtained from a motion database or other data store, containing animations of different types of motion. For instance, such an animation could have been originally created by an animator. As another example, the animation could be derived by monitoring the movement of an individual wearing a motion capture suit. More generally, any the gesture (and/or the locomotion) can be obtained through any suitable means, consistent with the present disclosure.

Upon receiving a request to splice a gesture of the first conversational gesture type into a first animation, the conversational gesture component 120 could determine an existing locomotion (as specified by the scene animation data 160) of a first virtual character (defined within the three-dimensional scene information 150), while the first virtual character is interacting with a second virtual character. For example, the conversational gesture component 120 could determine that the scene animation data 160 specifies that the first virtual character is performing a jogging motion.

In one embodiment, the conversational gesture component 120 is configured to analyze video data within the recorded video data library 130 (e.g., a locomotion database, a part of or separate from the existing motion database) to determine attributes of real-world individuals performing various types of locomotion. Generally, it is preferable for such locomotion video data to include a sufficient sampling of various individuals performing a particular locomotive activity (e.g., walking, jogging, etc.). For example, the recorded video data library 130 could contain video data of walking and jogging motions captured from a number of male and female actors, having varied styles of arm expansion, elbow bend and swing amplitude. In representing a particular locomotive activity, the conversational gesture component 120 could model a number of different attributes. For instance, the conversational gesture component 120 could use a breakdown of the locomotion into four phases: left swing/flight, left stance/contact, right swing/flight, and right stance/contact. Generally, the swing/flight phase occurs when one leg travels forward while walking (swing) or both legs are in the air for jogging (flight). During the stance/contact phase, the corresponding leg is on the ground. Typically, the root altitude of the individual increases during flight phases and decreases during contact phases. The conversational gesture component 120 can be configured to dynamically determine when the various phases of locomotion begin and end for a given instance of video content. In a particular embodiment, a user(s) manually annotates the locomotion phases for video data within the recorded video data library 130.

The conversational gesture component 120 can consolidate this information into the conversational gesture data model 140 and can use such a model to splice a gesture of a particular conversational gesture type into a movement of a virtual character within the three-dimensional scene information 150. In doing so, the conversational gesture component 120 can modify and customize the movement of the conversational gesture to match the movement of the virtual character's existing locomotion, to produce a more realistic and natural looking rendering of the virtual scene.

For instance, the conversational gesture component 120 could modify the movement of the conversational gesture to ensure stylistic consistency between the movement of the conversational gesture and the movement of the existing locomotion, using the conversational gesture data model 140. Additionally, the conversational gesture component 120 could temporally synchronize the phase of the gesture with the cycle of the locomotion, based on information specified within the conversational gesture data model 140. That is, a given gesture could be performed at a different rate, depending on the locomotive activity the individual is performing. For example, an individual that is jogging at a relatively fast pace may perform the same gesture differently than an individual who is walking at a relatively slow rate, as the jogging individual's arms may be moving at a faster rate than the walking individual's arms. Additionally, the conversational gesture component 120 can be configured to modify the movement of the gesture to simulate arm disturbances resulting from interactions between the individual's body and the ground. For instance, a gesture performed by a jogging individual may include a bounce as the individual's feet land on the ground. By taking attributes of real-world gestures and locomotion (i.e., represented in the conversational gesture data model 140) into account when modifying the movement of the gesture and splicing the gesture into the existing locomotion of the virtual character, embodiments can produce a more realistic rendering of the virtual scene.

Once the gesture has been customized to match the virtual character's existing locomotion, the conversational gesture component 120 can splice the modified gesture into the existing locomotion. Generally, any number of different splicing techniques can be used. In one embodiment, the conversational gesture component 120 is configured to select a particular splicing technique to use, from a plurality of different splicing techniques, based on a type of the gesture being inserted. In a particular embodiment, the conversational gesture component 120 is configured to segment the virtual individual's skeleton into various sections when splicing the gesture into the existing locomotion. For example, the conversational gesture component 120 could segment the skeleton into a torso section, a lower-body section, a left arm section and a right arm section. Generally, as the lower-body motion is the dominant factor in locomotion and the torso swivels to its tempo, the conversational gesture component 120 could preserve the tempo of the lower body throughout time in the splicing process. For the left and right arm sections, the conversational gesture component 120 could apply spherical linear interpolation (slerp) to the arm joint rotations to transition from the locomotion swing to the gesture performance, as illustrated in Equation 1:

$$M_S^{arm} = \begin{cases} M_L^{arm}, & t \;!\in [t_{Pb}, t_{Re}] \\ M_G^{arm}, & t \in [t_{Sb}, t_{Se}] \\ slerp\left(M_L^{arm}, M_G^{arm}, \dfrac{t - t_{Pb}}{t_{Pe} - t_{Pb} + 1}\right), & t \in [t_{Pb}, t_{Pe}) \\ slerp\left(M_L^{arm}, M_G^{arm}, \dfrac{t - t_{Rb}}{t_{Re} - t_{Rb} + 1}\right), & t \in [t_{Rb}, t_{Re}] \end{cases} \quad \text{Equation 1}$$

Gesture – locomotive splicing for arms using spherical linear interpolation

Upon splicing the gesture into the virtual character's locomotion within the scene animation data 160, the conversational gesture component 120 could render video data based on the three-dimensional scene information 150 and the modified scene animation data 160. Doing so produces a more realistic and natural looking rendering, as the performance of the conversational gesture can be seamlessly integrated into the virtual character's locomotion.

FIGS. 2A-C illustrate rendered images with different preexisting movements into which a conversational gesture was spliced, according to embodiments described herein. As shown in FIG. 2A, the frame 200 illustrates a first virtual character 210 performing a conversational gesture 220. That is, in the frame 200, the conversational gesture component 120 has spliced a particular conversational gesture into a frame in which the virtual character 210 was performing a standing motion, resulting in the modified conversational gesture 220. In the frame 200, as the virtual character 210 was performing a standing motion, the conversational gesture component 120 could generally splice the conversational gesture to produce the frame 200 by compositing the movement of the conversational gesture with the preexisting movement of the virtual character 210, resulting in the gesture 220.

In contrast, as shown in FIG. 2B, the conversational gesture component 120 has spliced the same conversational gesture into a position in the animation at which the virtual character 210 is performing a walking motion, resulting in the frame 230 which includes the modified conversational gesture 240. In this example, the conversational gesture data model 140 determined that the virtual character 210 was performing a walking motion, and the conversational gesture component 120 modified the conversational gesture to match the walking locomotion, using the conversational gesture data model 140. In the frame 230, this is illustrated by the resulting gesture 240. The conversational gesture data model 140 then spliced the modified gesture into the walking locomotion, and rendered the frame 230 based on a temporal position within the resulting animation.

For instance, in doing so, the conversational gesture component 120 could determine a gaze of the virtual character 210 and could splice the gesture animation into the frame based in part on the determined gaze. For example, the conversational gesture component 120 could determine a direction in which the virtual character 210 is currently looking and the conversational gesture component 120 could modify the conversational gesture based in part on the gaze direction, using the conversational gesture data model 140. For instance, the conversational gesture component 120 could determine that the virtual character 210 is looking in the direction of the other virtual characters shown in the frame 230, and the conversational gesture component 120 could modify attributes of the conversational gesture accordingly (e.g., adjusting an orientation of the user's arms based on the gaze direction).

Likewise, as shown in FIG. 2C, the conversational gesture component 120 has spliced the conversational gesture into another position in the animation at which the virtual character 210 is performing a jogging motion, resulting in the frame 250 and the modified conversational gesture 260. For instance, in this example, the conversational gesture data model 140 could determine that the user 210 is performing a jogging locomotion. The conversational gesture component 120 could then access the conversational gesture data model 140 to determine attributes of the jogging locomotion (e.g., attributes of the temporal phases of preparation, stroke, hold and retraction for the jogging locomotion). Similarly, the conversational gesture component 120 could use the conversational gesture data model 140 to determine attributes of the gesture (e.g., a type of the gesture). The conversational gesture component 120 could then splice the modified gesture into the jogging locomotion, and could render the frame 250 for a particular temporal position within the animation, resulting in the depicted composite gesture 260.

Figure 3:
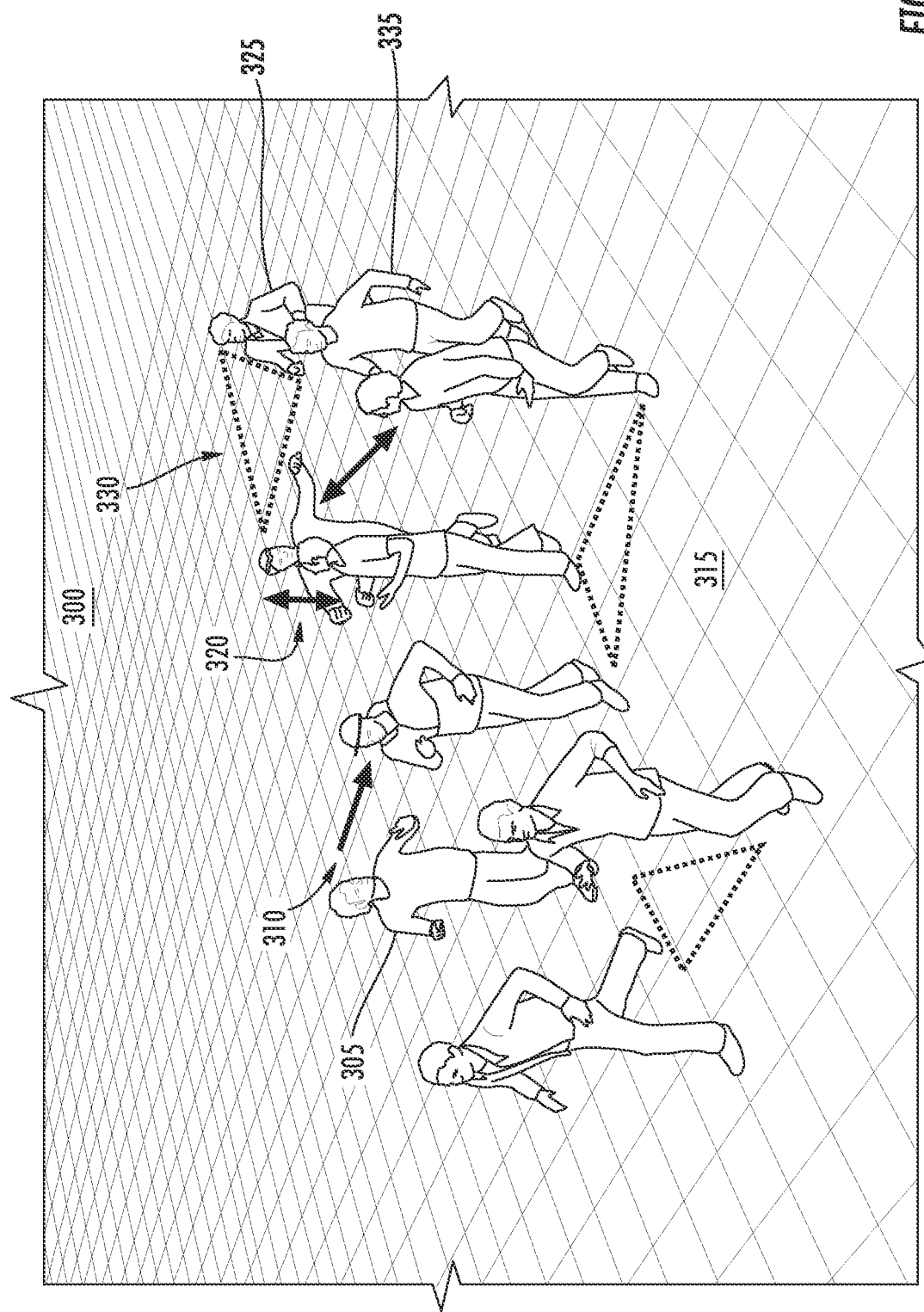
FIG. 3 illustrates a frame rendered from a three-dimensional scene containing multiple virtual characters engaged in group conversation, according to one embodiment described herein.

The conversational gesture component 120 can also be configured to consider a virtual character's gaze when modifying the conversational gesture and splicing the modified gesture into the character's locomotion. FIG. 3 illustrates a frame rendered from a three-dimensional scene containing multiple virtual characters engaged in group conversation, according to one embodiment described herein. As shown, the frame 300 includes a group of users, with user 305 conversing with user 315, and user 320 conversing with both user 325 and user 335, as shown by conversation arrows 330.

As discussed above, the conversational gesture component 120 can modify a conversational gesture to match a style of the character's locomotion (e.g., jogging, walking, etc.) and can synchronize the gesture with the locomotion's tempo. In addition, the conversational gesture component 120 can coordinate conversational gaze behaviors between the virtual characters in the scene, to produce a more realistic result. For example, the conversational gesture component 120 may modify an orientation of the characters' head and torso orientation, in order to create an addresser-addressee relationship (AAR) that defines the conversational interaction between the characters. Here, the addresser refers to the virtual character which is speaking, and the addressee (s) refer to the character(s) that are listening. Generally, such an AAR specification includes high level information such as labeling the various characters as the addresser, an addressee and coordinating timing of the gaze behaviors of the various characters. The conversational gesture component 120 can generate the AAR specification in various ways. For example, the conversational gesture component 120 could extract the AAR specification from the various captured conversations in the recorded video data library 130 when creating the conversational gesture data model 140. As another example, the conversational gesture component 120 could retrieve user-specified AAR information (e.g., within an annotated script). As yet another example, the conversational gesture component 120 could generate a predicted AAR specification based on statistics determined by analyzing the captured video data in the recorded video data library 130.

Once the AAR is determined, the conversational gesture component 120 could dynamically retrieve the positions of the virtual characters designated as the addresser and addressee within the three-dimensional scene information 150. The conversational gesture component 120 could then compute a yaw value that would fully rotate one character's head to look at another character on the horizontal plane. However, since an individual's gaze also typically involves eye movement in addition to head movement, a complete head rotation is not always necessary. As such, the conversational gesture component 120 could use a distribution to determine the torso yaw angle (e.g., randomly or pseudo-randomly calculating 60-100% of the computed yaw value for fully rotating a character's head). In applying the determined yaw angle, the conversational gesture component 120 could implement the rotation with a combination of spine and neck degrees of freedom. Additionally, if the conversational gesture component 120 determines that the addressee is in front of or behind the addresser by more than a predefined threshold amount of distance (e.g., 1 meter), the conversational gesture component 120 could apply a preset adjustment of forward/back lean (e.g., up to 15 degrees) to the spine joint of the addresser, in order to create a more realistic appearance. The conversational gesture component 120 could then layer the determined AAR head and torso orientations on top of the motion produced by splicing the gesture into the character's existing locomotion.

The conversational gesture component 120 can be configured to determine gaze behavior for the various characters involved in a conversation for the entirety of the conversation. For instance, the conversational gesture component 120 could use the conversational gesture data model 140 to classify each character in the conversation as corresponding to a particular type of user in the captured video segments in the recorded video data library 130. The conversational gesture component 120 could then determine the gaze behavior for each addresser and addressee based on derived statistics for the corresponding types of users. That is, during a conversation, the addresser and addressee may gaze at and away from each other, and the duration of this behavior may not be the same as the duration of the conversational gesture. Moreover, variation may exist for this gaze behavior between different types of users and different types of locomotion. As such, the conversational gesture component 120 can determine a virtual character's gaze behavior by accessing statistics for the corresponding type of user and the type of locomotion the character is performing within the conversational gesture data model 140. Additionally, the conversational gesture component 120 may add a random (or pseudo-random) variation to this determined value.

Figure 4:
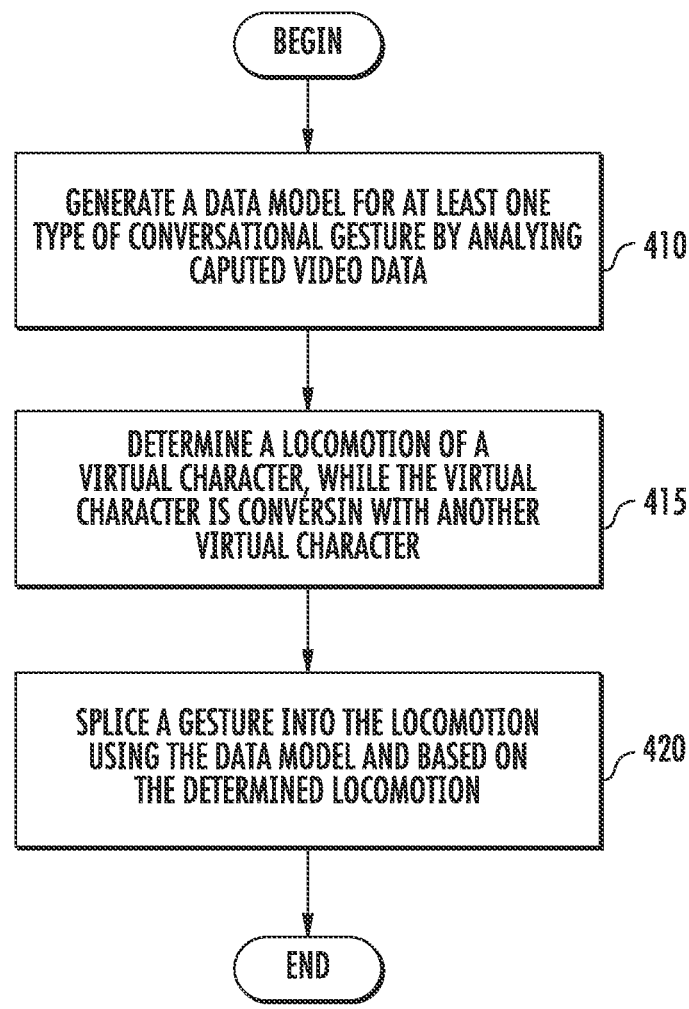
FIG. 4 is a block diagram illustrating a method of splicing a gesture into an existing locomotive activity performed by a virtual character, according to one embodiment described herein.

FIG. 4 is a block diagram illustrating a method of splicing a gesture into an existing locomotive activity performed by a virtual character, according to one embodiment described herein. As shown, the method 400 begins at block 410, where the conversational gesture component 120 generates a data model 140 for at least one type of conversational gesture by analyzing captured video data (e.g., in the recorded video data library 130). As discussed above, the conversational gesture component 120 could be configured to recognize a number of different types of gestures, e.g., beat gestures, deictic gestures, iconic gestures and metaphoric gestures. Additionally, the conversational gesture component 120 could be configured to determine a number of gesture attributes, such as the type of the gesture, the magnitude of the gesture, the elbow bend involved in performing the gesture, the arm displacement involved in performing the gesture, the facing direction of the palm while performing the gesture, the peak of the gesture, and so on. For example, such attributes could be collected from the captured video data and the conversational gesture component 120 could generate one or more statistics from the collected attribute data (e.g., a mean amount of elbow bend, a median amount of arm displacement, etc.).

The conversational gesture component 120 also determines a locomotion of a virtual character, while the virtual character is conversing with another virtual character (block 415). For example, the conversational gesture component 120 could be configured to represent the locomotion of the virtual character in multiple phases, e.g., left swing/flight, left stance/contact, right swing/flight, right stance/contact.

The conversational gesture component 120 then splices the gesture into the locomotion of the virtual character using the determine data model and based on the determined locomotion (block 420), and the method 400 ends. As an example, the conversational gesture component 120 could customize the gesture to match a tempo of the locomotion and could stylize the gesture to match attributes of the locomotion. The conversational gesture component 120 could then splice the customized gesture together with the locomotion to produce a smooth and realistic rendering of the conversational gesture.

Figure 5:
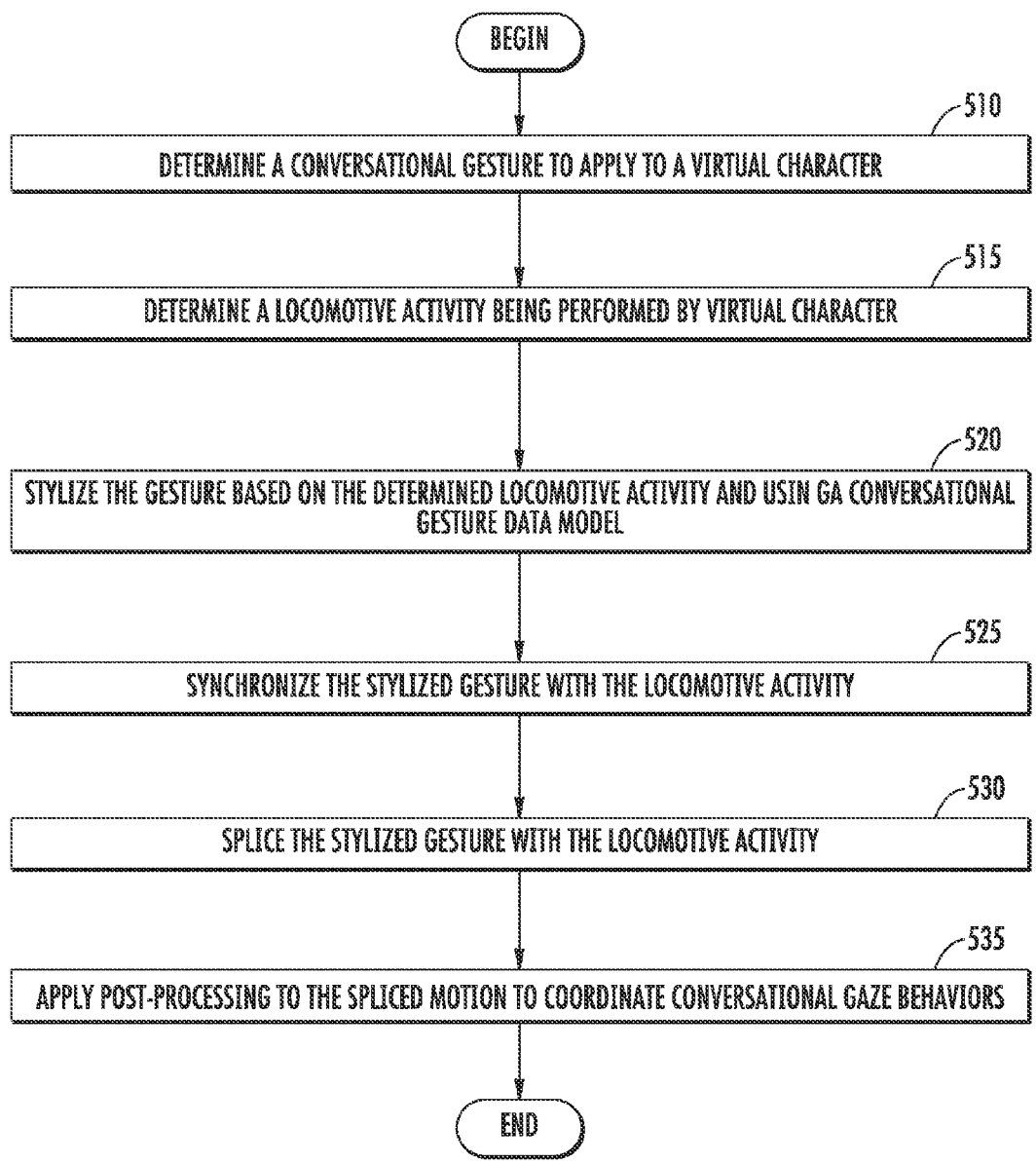
FIG. 5 is a block diagram illustrating a method for stylistically splicing a modified gesture into an existing locomotive activity performed by a virtual character, according to one embodiment described herein.

FIG. 5 is a block diagram illustrating a method for stylistically splicing a modified gesture into an existing locomotive activity performed by a virtual character, according to one embodiment described herein. As shown, the method 500 begins at block 510, where the conversational gesture component 120 determines a conversational gesture to apply to a virtual character. Additionally, the conversational gesture component 120 determines a locomotive activity being performed (or to be performed) by the virtual character (block 515).

The conversational gesture component 120 then stylizes the gesture based on the determined locomotive activity and using a conversational gesture data model (block 520). For instance, the conversational gesture component 120 could modify the gesture to match the style of the locomotion. As an example, the conversational gesture component 120 could compute a mean arm pose of the locomotion clip. In doing so, the conversational gesture component 120 could determine a degrees of freedom values for the virtual character's shoulder, elbow and wrist. The conversational gesture component 120 could then compute the difference between the rest position of the gesture and the computed mean arm pose, and could use this difference to adjust the original gesture. For instance, the conversational gesture component 120 could extract the gesture from the base standing poses as an offset of the virtual character's average pose, and could then layer the gesture onto the desired locomotion clip starting pose to produce the stylized gesture. Additionally, the conversational gesture component 120 could incorporate dynamic features of the character's arm swing within the determined locomotive activity into the gesture.

The conversational gesture component 120 then synchronizes the stylizes gesture with a tempo of the locomotive activity (block 525). As noted above, temporally, a gesture can be represented by its preparation, stroke, hold and retraction phases, while locomotion repeats its flight/contact cycles with a certain tempo. As a general matter, these phases are linked, in that significantly more stroke peaks happen during the contact phase, and thus pedestrians are likely to align their stroke peaks to the locomotion contact phase. Accordingly, the conversational gesture component 120 can align the gesture with the tempo of the locomotive activity by synchronizing the stroke peaks with the contact cycles of the locomotive activity.

In the event the conversational gesture component 120 determines that a stroke peak for a given gesture does not align with the locomotion contact phase based on the timing of the corresponding utterance, the conversational gesture component 120 can align the stroke peak with a point in time that is a predefined amount of time before the first contact phase point, as gestures tend to be performed a period of time (e.g., 0.2-0.6 seconds) earlier than the accompanying utterance.

Additionally, the conversational gesture component 120 can synchronize the arm shake involved in the conversational gesture with the contact phase of the locomotion. For instance, the conversational gesture component 120 could synthesize the arm shake to the beat of the locomotion using the motion of the root to adjust the movement of the character's elbow. As an example, the conversational gesture component 120 could layer the influence of the root height change on top of the original elbow rotation for the gesture. In doing so, the conversational gesture component 120 would layer a lower amount of arm bounce on top of the original rotation for locomotive activities like walking (i.e., where the root height change is lower) and would layer a greater amount of arm bounce on for locomotive activities like jogging and running (i.e., where the root height change is greater), thereby producing a more realistic rendering of the conversational gesture.

The conversational gesture component 120 then splices the stylized gesture with the locomotive activity (block 530). Additionally, in the depicted embodiment, the conversational gesture component 120 applies one or more post-processing effects to the spliced motion to coordinate conversational gaze behaviors between the virtual characters (block 535), and the method 500 ends. For example, the conversational gesture component 120 could determine an AAR specification for two or more virtual characters within the scene and could determine respective head and torso yaw values and gaze durations for each of the two or more virtual characters. Doing so provides a more realistic rendering of the conversation between the virtual characters.

Figure 6:
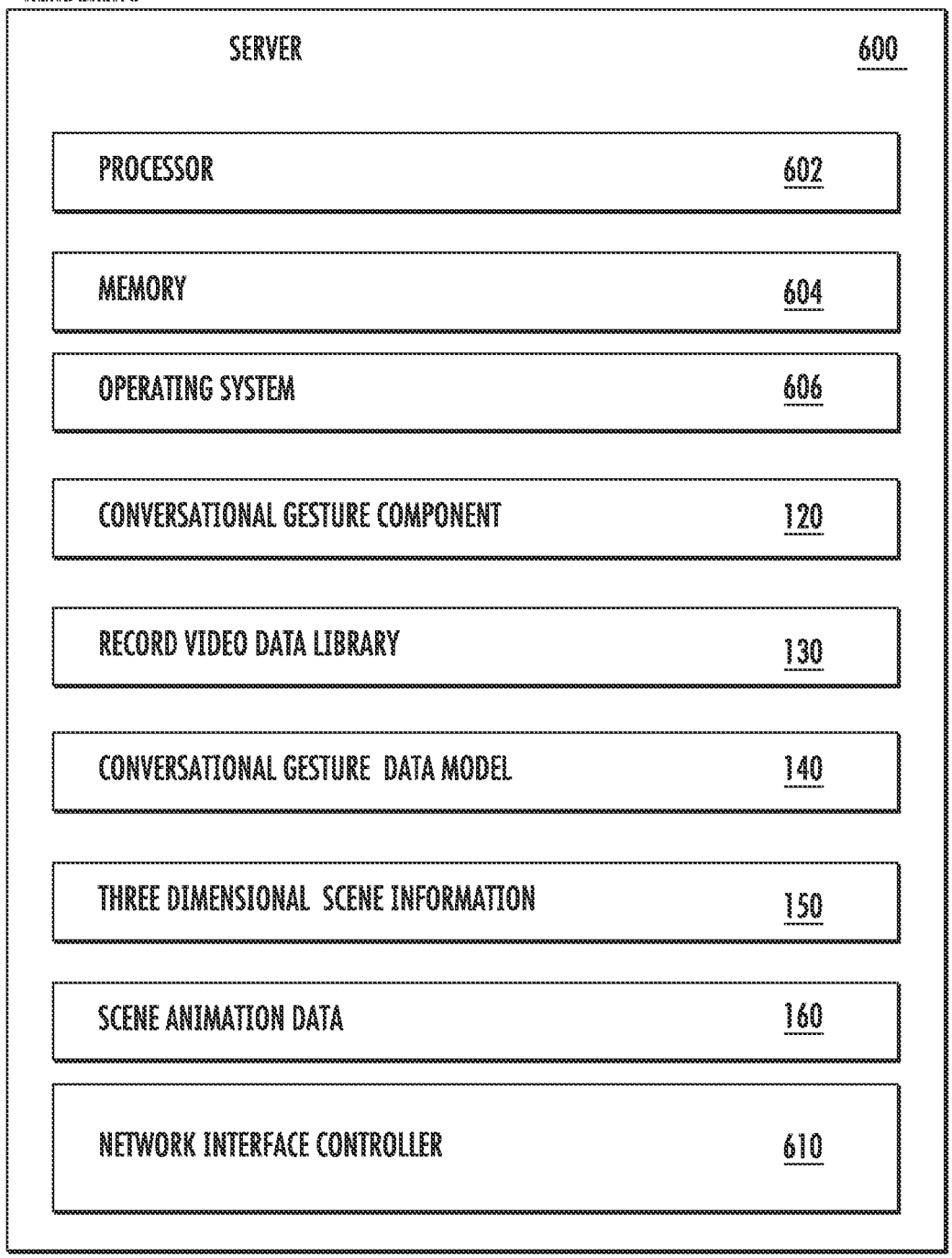
FIG. 6 is a block diagram illustrating a system configured with a conversational gesture component 120, according to one embodiment described herein.

FIG. 6 is a block diagram illustrating a system configured with a conversational gesture component 120, according to one embodiment described herein. As shown, the rendering server 600 includes, without limitation, a central processing unit (CPU) 602, a memory 604, and a network interface controller 610, each connected to a bus (not shown). The rendering server 600 may also include an I/O device interface (not shown) connecting I/O devices (e.g., keyboard, mouse, and display devices) to the rendering server 600. Further, in context of this disclosure, the computing elements shown in the rendering server 600 may correspond to a physical computing system (e.g., a system in a data center) or may be a virtual computing instance executing within a computing cloud.

The CPU 602 retrieves and executes programming instructions stored in the memory 604 as well as stores and retrieves application data residing in the memory 604. An interconnect (not shown) can be used to transmit programming instructions and application data between CPU 602, I/O devices interface, storage media (not shown), network interface controller 620, and memory 604. Note, CPU 602 is included to be representative of a single CPU, multiple CPUs, a single CPU having multiple processing cores, and the like. Memory 604 is generally included to be representative of a random access memory. Storage such as a disk drive storage device can also be connected to rendering server 600. Such storage may be a combination of fixed and/or removable storage devices, such as fixed disc drives, removable memory cards, or optical storage, network attached storage (NAS), or a storage area-network (SAN).

Illustratively, the memory 604 includes an operating system 606, the conversational gesture component 120, recorded video data library 130, conversational gesture data model 140, three-dimensional scene information 150 and scene animation data 160. The conversational gesture component 120 is generally configured to produce a realistic depiction of conversational gestures in a rendered scene. The conversational gesture component 120 could generate the conversational gesture data model 140 for at least one type of conversational gesture, by analyzing video data in the recorded video data library 130 to determine motion attribute data for a plurality of conversational gestures. Upon receiving a request to splice a gesture into the scene animation data 160 for the three-dimensional scene represented by the three-dimensional scene information 150, the conversational gesture component 120 could determine a locomotion of a first virtual character shown in the scene animation data 160, while the first virtual character is interacting with a second virtual character within the animation. The conversational gesture component 120 could then modify the gesture using the conversational gesture data model 140 and based on the existing locomotion within the scene. The conversational gesture component 120 could then splice the modified gesture into the scene animation data 160. Doing so produces a realistic and higher quality rendering of the three-dimensional scene containing a conversational gesture.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:

1. A method, comprising:
   generating a data model for a first conversational gesture type, by analyzing captured video data to determine motion attribute data for a plurality of conversational gestures;
   upon receiving a request to splice a gesture of the first conversational gesture type into a first animation, determining a locomotion of a first virtual character, while the first virtual character is interacting with a second virtual character within the first animation;
   stylizing, by operation of one or more computer processors, a gesture of the first conversational gesture type to match style criteria associated with the locomotion of the first virtual character based on the motion attribute data of the generated data model for the first conversational gesture type; and
   splicing the stylized gesture into the locomotion of the first virtual character within the first animation.

2. The method of claim 1, further comprising:
   determining a gaze of the virtual character within the first animation,
   wherein splicing the gesture of the first conversational gesture type into the first animation, using the generated data model, is further based on the determined gaze of the virtual character.

3. The method of claim 1, wherein splicing the stylized gesture of the first conversational gesture type into the locomotion of the first virtual character within the first animation further comprises:
   determining a locomotion of the first virtual character within the first animation;
   modifying movement of the gesture to match the determined locomotion, based on generated data model.

4. The method of claim 3, wherein splicing the stylized gesture of the first conversational gesture type into the locomotion of the first virtual character within the first animation, further comprises:
   synchronizing the modified movement of the gesture to match a tempo of the determined locomotion.

5. The method of claim 4, wherein splicing the stylized gesture of the first conversational gesture type into the locomotion of the first virtual character within the first animation, further comprises:
   simulating an arm bounce of the first virtual character, based on the determined locomotion and based on the generated data model; and
   splicing the simulated arm bounce into the first animation.

6. The method of claim 1, further comprising:
   identifying a conversation within animation;
   determining, at each of a plurality of positions within the conversation, a gaze of the first virtual character; and
   calculating, for each of the determined plurality of gazes, a respective body orientation for the first virtual character, based on the plurality of determined gazes and the generated data model.

7. The method of claim 1, further comprising:
   determining one of a plurality of splicing techniques corresponding to the first conversational gesture type,
   wherein splicing the gesture of the first conversational gesture type into the locomotion of the first virtual character within the first animation is performed using the determined splicing technique.

8. The method of claim 1, further comprising:
   determining a plurality of virtual characters, inclusive of the first virtual character, that are participants to a group conversation;
   determining, for each of the plurality of virtual characters, whether the respective virtual character is an addresser or an addressee in the group conversation;
   determining, for each of the plurality of virtual characters, respective head and torso orientations at one or more positions within the first animation, based on the addresser and addressee determinations; and
   performing one or more post-processing operations based on at least a portion of the determined head and torso orientations.

9. The method of claim 1, further comprising:
   rendering a plurality of frames of video data, based on the first animation containing the spliced gesture of the first conversational gesture type into the movement of the first virtual character.

10. The method of claim 1, wherein first animation for at least one of (i) the gesture and (ii) the locomotion of the first virtual character, is retrieved from a motion data store.

11. The method of claim 10, wherein the first animation was created by an animator using an animation toolkit software application.

12. The method of claim 10, wherein the first animation comprises motion capture data created by monitoring a movement of at least one individual wearing a motion tracking suit.

13. A non-transitory computer-readable medium containing computer program code that, when executed, performs an operation, comprising:
   generating a data model for a first conversational gesture type, by analyzing captured video data to determine motion attribute data for a plurality of conversational gestures;

upon receiving a request to splice a gesture of the first conversational gesture type into a first animation, determining a locomotion of a first virtual character, while the first virtual character is interacting with a second virtual character within the first animation;

stylizing a gesture of the first conversational gesture type to match style criteria associated with the locomotion of the first virtual character based on the motion attribute data of the generated data model for the first conversational gesture type; and splicing the stylized gesture into the locomotion of the first virtual character within the first animation.

14. The non-transitory computer-readable medium of claim 13, the operation further comprising:

determining a gaze of the virtual character within the first animation, wherein splicing the gesture of the first conversational gesture type into the first animation, using the generated data model, is further based on the determined gaze of the virtual character.

15. The non-transitory computer-readable medium of claim 13, wherein splicing the stylized gesture of the first conversational gesture type into the locomotion of the first virtual character within the first animation, further comprises:

determining a locomotion of the first virtual character within the first animation;

modifying movement of the gesture to match the determined locomotion, based on generated data model.

16. The non-transitory computer-readable medium of claim 15, wherein splicing the stylized gesture of the first conversational gesture type into the locomotion of the first virtual character within the first animation, further comprises:

synchronizing the modified movement of the gesture to match a tempo of the determined locomotion.

17. The non-transitory computer-readable medium of claim 16, wherein splicing the stylized gesture of the first conversational gesture type into the locomotion of the first virtual character within the first animation, further comprises:

simulating an arm bounce of the first virtual character, based on the determined locomotion and based on the generated data model; and splicing the simulated arm bounce into the first animation.

18. The non-transitory computer-readable medium of claim 13, the operation further comprising:

identifying a conversation within animation;

determining, at each of a plurality of positions within the conversation, a gaze of the first virtual character; and calculating, for each of the determined plurality of gazes, a respective body orientation for the first virtual character, based on the plurality of determined gazes and the generated data model.

19. The non-transitory computer-readable medium of claim 10, the operation further comprising:

determining a plurality of virtual characters, inclusive of the first virtual character, that are participants to a group conversation;

determining, for each of the plurality of virtual characters, whether the respective virtual character is an addresser or an addressee in the group conversation;

determining, for each of the plurality of virtual characters, respective head and torso orientations at one or more positions within the first animation, based on the addresser and addressee determinations and an updated position of the first virtual character, the updated position determined using the generated data model and based on the locomotion of the first virtual character within the animation; and performing one or more post-processing operations based on at least a portion of the determined head and torso orientations.

20. A system, comprising:

one or more computer processors; and a memory containing computer program code that, when executed by operation of the one or more computer processors, performs an operation comprising:

generating a data model for a first conversational gesture type, by analyzing captured video data to determine motion attribute data for a plurality of conversational gestures;

upon receiving a request to splice a gesture of the first conversational gesture type into a first animation, determining a locomotion of a first virtual character, while the first virtual character is interacting with a second virtual character within the first animation;

stylizing a gesture of the first conversational gesture type to match style criteria associated with the locomotion of the first virtual character based on the motion attribute data of the generated data model for the first conversational gesture type; and splicing the stylized gesture into the locomotion of the first virtual character within the first animation.

* * * * *

UNITED STATES PATENT AND TRADEMARK OFFICE
CERTIFICATE OF CORRECTION

PATENT NO. : 9,811,937 B2  Page 1 of 2
APPLICATION NO. : 14/869514
DATED : November 7, 2017
INVENTOR(S) : Carol A. O'Sullivan et al.

It is certified that error appears in the above-identified patent and that said Letters Patent is hereby corrected as shown below:

On the Title Page

On the page 2, in Column 1, under "Other Publications", Line 13, delete "stufy" and insert -- study --, therefor.

On the page 2, in Column 1, under "Other Publications", Line 16, delete "environemtnal" and insert -- environmental --, therefor.

On the page 2, in Column 1, under "Other Publications", Line 24, delete "Mulitparty" and insert -- Multiparty --, therefor.

On the page 2, in Column 1, under "Other Publications", Line 35, delete "be" and insert -- the --, therefor.

On the page 2, in Column 2, under "Other Publications", Line 11, delete ""Autoactic" and insert -- "Automatic --, therefor.

On the page 2, in Column 2, under "Other Publications", Line 13, delete "Eurpographics" and insert -- Eurographics --, therefor.

On the page 2, in Column 2, under "Other Publications", Line 21, delete "Converstaional" and insert -- Conversational --, therefor.

On the page 2, in Column 2, under "Other Publications", Line 26, delete "distintiveness" and insert -- distinctiveness --, therefor.

On the page 2, in Column 2, under "Other Publications", Line 42, delete "Interacation" and insert -- Interaction --, therefor.

Signed and Sealed this
Sixth Day of March, 2018

Andrei Iancu
*Director of the United States Patent and Trademark Office*

On the page 2, in Column 2, under "Other Publications", Line 48, delete "Trasactions" and insert -- Transactions --, therefor.

On the page 2, in Column 2, under "Other Publications", Line 52, delete "simuation,"" and insert -- simulation," --, therefor.

On the page 2, in Column 2, under "Other Publications", Line 54, delete "plasuible" and insert -- plausible --, therefor.

On the page 2, in Column 2, under "Other Publications", Line 63, delete "perforance,"" and insert -- performance," --, therefor.

In the Drawings

On sheet 6 of 8, in Figure 4, reference numeral 410, Line 2, delete "ANALYING" and insert -- ANALYZING --, therefor.

On sheet 6 of 8, in Figure 4, reference numeral 410, Line 3, delete "CAPUTED" and insert -- CAPTURED --, therefor.

On sheet 6 of 8, in Figure 4, reference numeral 415, Line 3, delete "CONVERSIN" and insert -- CONVERSING --, therefor.